(12) United States Patent
Schankin et al.

(10) Patent No.: US 8,036,863 B2
(45) Date of Patent: Oct. 11, 2011

(54) METHOD FOR CUSTOMIZING A BEARING BORE

(75) Inventors: David P Schankin, Harper Woods, MI (US); Suhui W Wang, Detroit, MI (US); Chih-Hung Chung, Troy, MI (US); Zhaohui Sun, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 456 days.

(21) Appl. No.: 12/362,988

(22) Filed: Jan. 30, 2009

(65) Prior Publication Data

US 2009/0204247 A1 Aug. 13, 2009

Related U.S. Application Data

(60) Provisional application No. 61/026,808, filed on Feb. 7, 2008.

(51) Int. Cl.
*G06F 17/10* (2006.01)
(52) U.S. Cl. ............. 703/2; 703/1; 703/6; 703/7; 703/8; 345/418; 345/419; 345/420; 345/586; 345/618; 345/619; 345/621; 345/643; 345/952; 345/954; 700/29; 700/30; 700/31; 700/98; 700/117
(58) Field of Classification Search .................. 703/1, 2, 703/6, 7, 8; 700/29, 30, 31, 98, 117; 345/418, 345/419, 420, 586, 618, 619, 621, 643, 952, 345/954

See application file for complete search history.

(56) References Cited

U.S. PATENT DOCUMENTS

| | | | |
|---|---|---|---|
| 2,149,009 A | 2/1939 | Chievitz | |
| 2,397,647 A | 4/1946 | Buckwalter | |
| 3,084,003 A | 4/1963 | Matt et al. | |
| 3,202,466 A | 8/1965 | Kaptur | |
| 3,311,431 A | 3/1967 | Hilliar | |
| 3,449,032 A | 6/1969 | Scheufler | |
| 3,692,372 A | 9/1972 | Pineo | |
| 4,952,078 A | 8/1990 | Ankenbauer et al. | |
| 4,963,041 A | 10/1990 | Sowards | |
| 5,028,152 A * | 7/1991 | Hill et al. | 384/557 |
| 5,073,039 A | 12/1991 | Shervington | |
| 5,562,349 A | 10/1996 | Nespodzany et al. | |
| 5,598,747 A | 2/1997 | Schetter et al. | |
| 5,609,422 A | 3/1997 | Mueller et al. | |
| 5,654,904 A * | 8/1997 | Thakur | 702/137 |

(Continued)

FOREIGN PATENT DOCUMENTS

DE 20211890 U1 10/2002

(Continued)

OTHER PUBLICATIONS

Written Opinion of the International Searching Authority filed Aug. 26, 2010, pp. 1-7.*

*Primary Examiner* — Kamini S Shah
*Assistant Examiner* — Kibrom Gebresilassie
(74) *Attorney, Agent, or Firm* — Harness, Dickey & Pierce, P.L.C.

(57) ABSTRACT

A method for customizing a bearing bore in a housing so that the bearing assembly will transmit load in a desired manner over a predetermined range of operating temperatures.

20 Claims, 4 Drawing Sheets

U.S. PATENT DOCUMENTS

| | | |
|---|---|---|
| 6,250,815 B1 | 6/2001 | Picone et al. |
| 6,293,704 B1 | 9/2001 | Gradu |
| 6,561,698 B1 * | 5/2003 | Pribytkov .................... 384/513 |
| 6,806,615 B2 * | 10/2004 | Enomoto et al. ....... 310/216.096 |
| 6,810,369 B1 * | 10/2004 | Ranold ............................. 703/2 |
| 6,895,371 B1 * | 5/2005 | Ames et al. ....................... 703/1 |
| 6,896,491 B2 | 5/2005 | Trubnikov et al. |
| 7,175,350 B2 | 2/2007 | Gradu et al. |
| 7,203,628 B1 * | 4/2007 | St. Ville ............................ 703/1 |
| 7,576,738 B2 * | 8/2009 | Litke et al. .................... 345/420 |
| 7,761,266 B2 * | 7/2010 | Mangon et al. .................. 703/2 |
| 2003/0030345 A1 * | 2/2003 | Enomoto et al. .............. 310/216 |
| 2005/0087933 A1 * | 4/2005 | Gittler ........................... 277/387 |
| 2008/0089628 A1 | 4/2008 | Kiuchi et al. |
| 2008/0247698 A1 * | 10/2008 | Albert ........................... 384/493 |
| 2008/0291199 A1 * | 11/2008 | Ravnikar et al. .............. 345/419 |
| 2009/0055135 A1 * | 2/2009 | Tang et al. ........................ 703/1 |
| 2009/0325125 A1 * | 12/2009 | Diangelo et al. .............. 433/173 |

FOREIGN PATENT DOCUMENTS

| | | |
|---|---|---|
| KR | 19950003591 Y1 | 5/1995 |
| WO | 2006/072151 A1 | 7/2006 |
| WO | 2007/105655 A1 | 9/2007 |

* cited by examiner

METHOD FOR CUSTOMIZING A BEARING BORE

CROSS-REFERENCE TO RELATED APPLICATIONS

This application claims the benefit of U.S. Provisional Patent Application Ser. No. 61/026,808 entitled "Method For Customizing A Bearing Bore" and filed Feb. 7, 2008. The disclosure of the aforementioned patent application is hereby incorporated by reference as if fully set forth in its/their entirety herein.

INTRODUCTION

The present invention generally relates to assemblies that are comprised of a housing and a bearing assembly and more particularly to a method for customizing a bearing bore in a housing so that the bearing assembly will transmit load in a desired manner over a predetermined range of operating temperatures.

It is common practice to mount two structures to one another with a bearing assembly to permit rotation of one structure relative to the other structure. Such bearing assemblies can include an inner bearing race, an outer bearing race and a plurality of bearing elements that can be disposed between the inner and outer bearing races. The bearing elements, which can be rollers or spherical balls, can distribute load between the inner and outer bearing races. Preferably, the load that is transmitted between the inner and outer bearing races is distributed through all of the bearing elements.

We have noted, however, that some structures into which a bearing assembly is received can be distorted during exposure to a predetermined change in temperature and that such distortion can cause the load that is distributed between the inner and outer bearing races to be distributed over a portion of the bearing elements. In such instances, the bearing elements can be overloaded, leading to the premature failure of the bearing assembly.

U.S. Pat. No. 2,345,952 describes a bearing arrangement in which a bearing assembly is pressed into a hollow cylindrical hub. Longitudinally extending slots formed into the hub create a plurality of cantilevered fingers that engage the outer bearing race of the bearing assembly. The cantilevered fingers can deflect outwardly as the hub experiences thermal expansion to thereby limit the radially inwardly directed force that is exerted by the hub onto the outer bearing race. We note, however, that it is frequently not possible to form such longitudinally extending slots about a hub. For example, it may not be possible to incorporate such longitudinally extending slots into a structure having oil galleries for circulating oil to the bearing assembly to lubricate the bearing assembly.

U.S. Pat. No. 3,692,372 describes a bearing arrangement in which two techniques are employed to compensate for thermal expansion. The first technique includes an annular relief groove is formed around the periphery of the outer bearing race of the bearing assembly radially in-line with a radially extending circumferential plate to overcome the radial stiffness of the plate. The second technique includes a U-shaped slot that is formed into a bearing support plate about a boss that is relatively thicker in cross-section; the U-shaped slot isolates three sides of the boss to permit radial expansion of the bearing support plate in the area of the boss. We note, however, that it is frequently not possible to incorporate such U-shaped slots into a structure to isolate the relatively thicker portions of the structure and that depending on the particular geometry of the structure, annular relief grooves might not be effective.

SUMMARY

In one form, the present teachings provide a method for forming a bearing pocket in a housing. The bearing pocket is configured to receive a bearing assembly having an inner bearing race, an outer bearing race and a plurality of bearing elements disposed between the inner and outer bearing races. The bearing pocket has a bearing bore with a circumferential surface that is configured to be engaged via an interference fit with the outer bearing race. The method includes: generating a mathematical model of the housing, the mathematical model including a predetermined coefficient of thermal expansion and a definition of geometry of at least a portion of the housing that includes the bearing pocket; using the mathematical model to determine whether the circumferential surface of the bearing bore will distort in response to a predetermined change in a temperature of the housing such that one or more of the bearing elements cease to distribute load between the inner bearing race and the outer bearing race; and modifying the mathematical model of the housing to reflect a change in the geometry of the housing in which at least one recess is formed in the circumferential surface, the at least one recess being configured to reduce the distortion of the circumferential surface effected by the predetermined change in the temperature of the housing such that all of the bearing elements distribute load between the inner bearing race and the outer bearing race.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
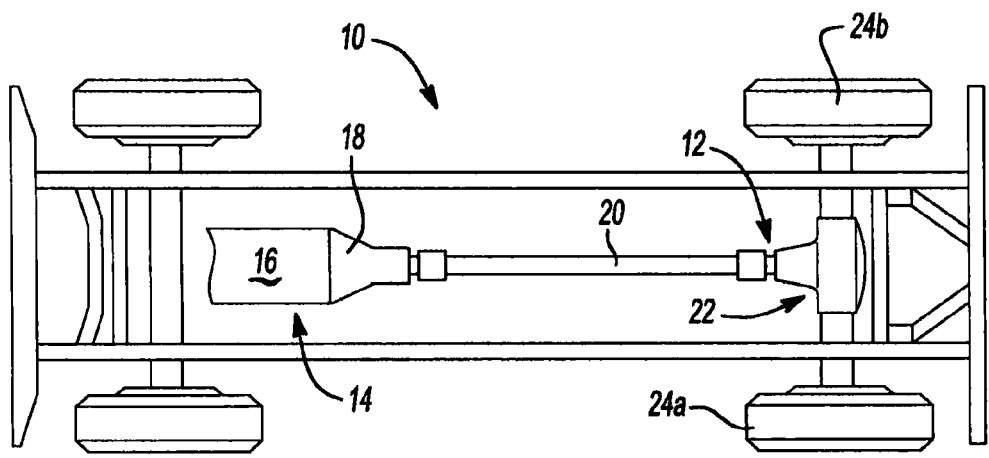
FIG. 1 is a is a schematic illustration of a vehicle having an axle assembly constructed in accordance with the teachings of the present disclosure.

With reference to FIG. 1 of the drawings, a vehicle constructed in accordance with the teachings of the present invention is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle assembly 22 where it can be selectively apportion in a predetermined manner to the left and right rear wheels 24a and 24b, respectively.

Figure 2:
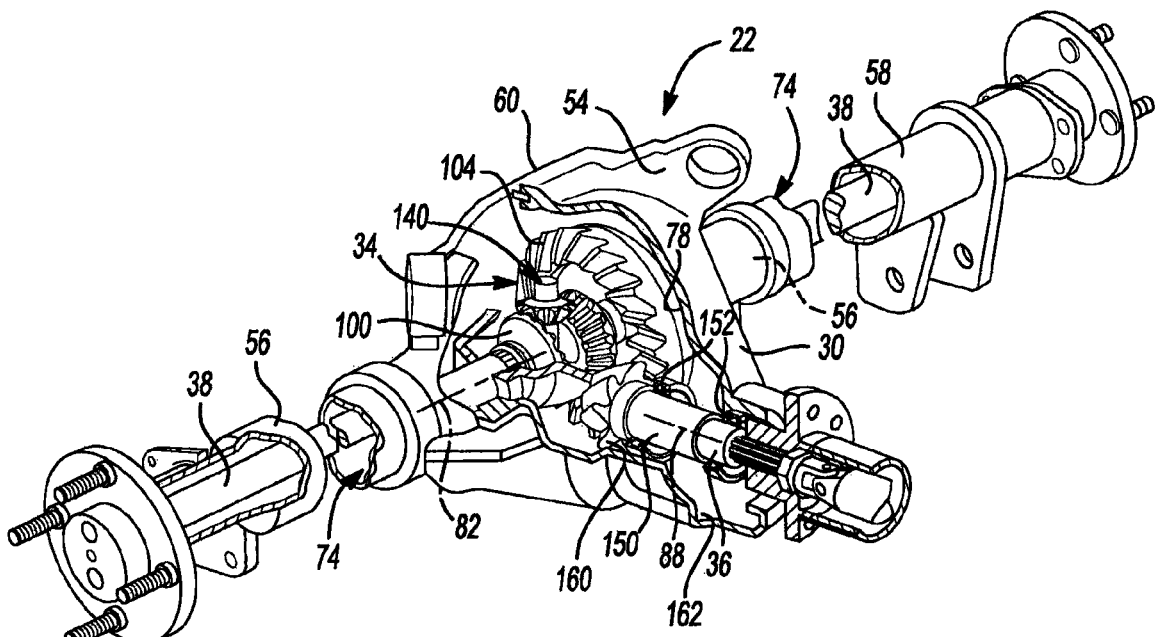
FIG. 2 is a partially broken-away perspective view of a portion of the vehicle of FIG. 1 illustrating the axle assembly in more detail.
Figure 3:
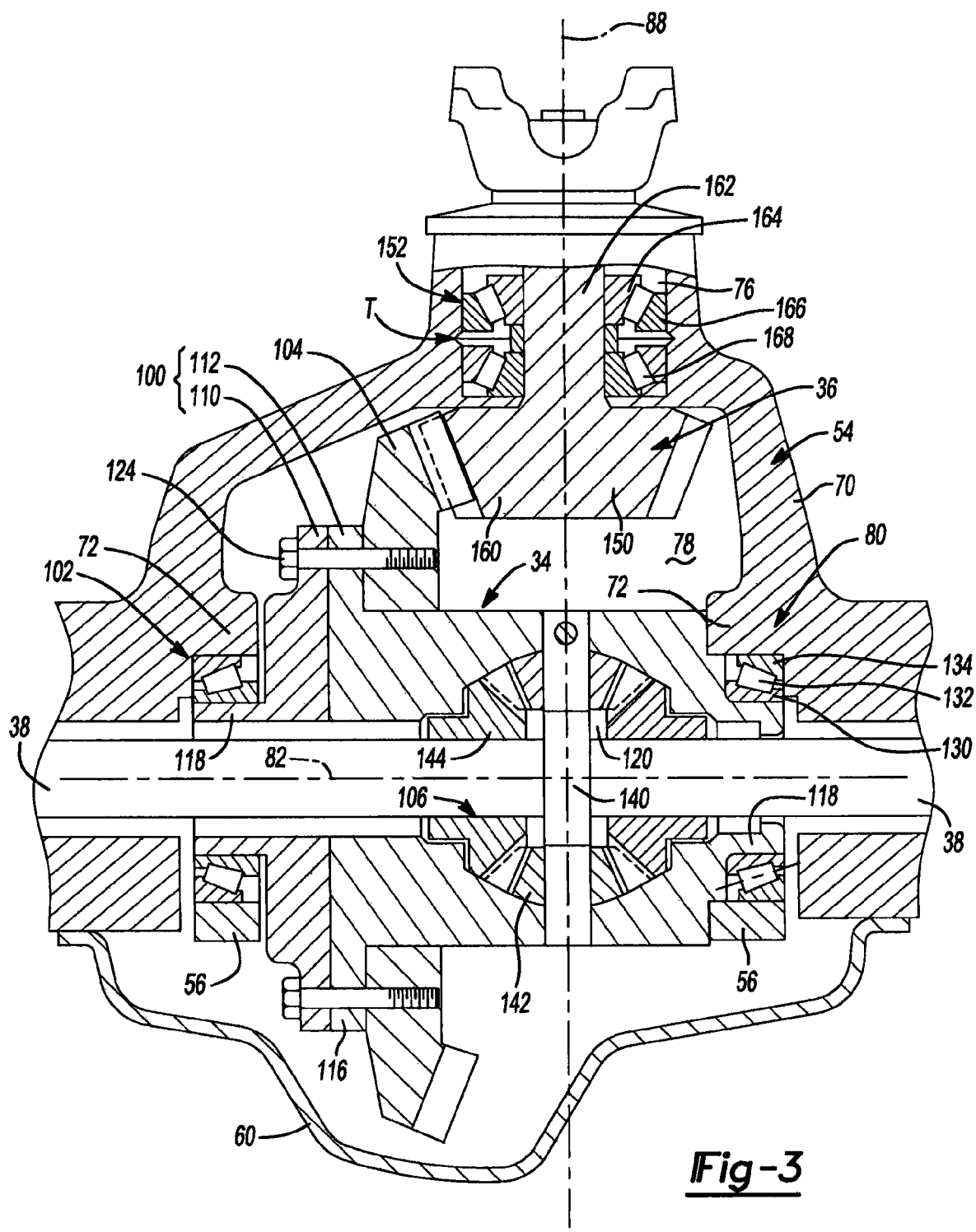
FIG. 3 is a longitudinal sectional view of a portion of the axle assembly.

With reference to FIGS. 2 and 3, the rear axle assembly 22 can include an axle housing assembly 30, a differential assembly 34, an input pinion assembly 36 and a pair of axle shafts 38. The axle housing assembly 30 is illustrated to be a Salisbury-type axle housing assembly, but it will be appreciated that the teachings of the present disclosure have application to other types of axle housing assemblies, including independent and banjo axle housing assemblies, as well as to other types of housings. Moreover, those of ordinary skill in the art will appreciate that the axle housing assembly 30 could be configured for a front axle or a rear axle as desired. The axle housing assembly 30 can include a carrier housing 54, a pair of bearing caps 56, a pair of axle tubes 58 and a cover 60 and can include a lubricant sump or reservoir 62 (FIG. 4) and a first oil gallery 64 (FIG. 4).

Figure 4:
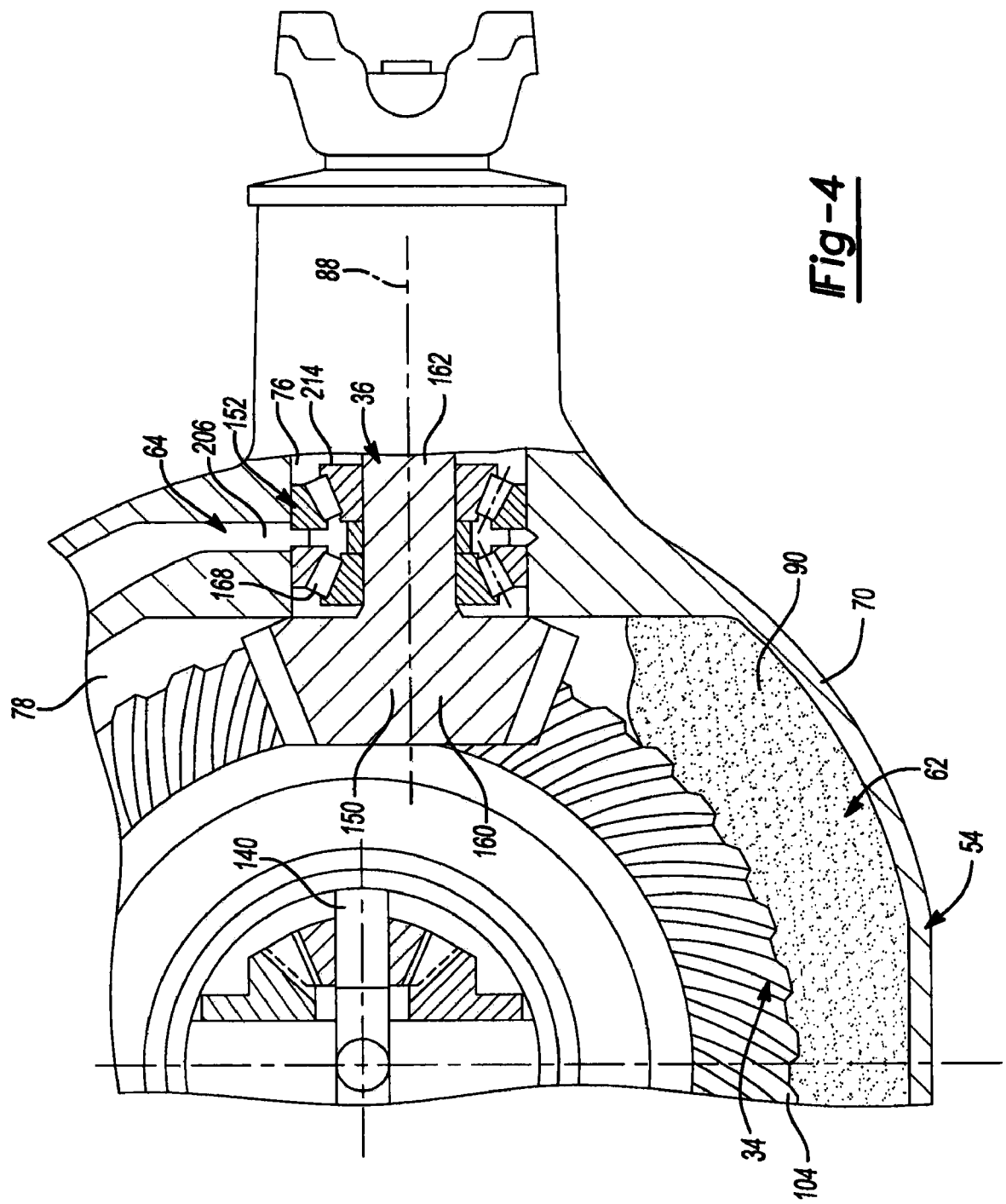
FIG. 4 is a section view taken along the line 4-4 of FIG. 3.

With reference to FIGS. 3 and 4, the carrier housing 54 can include a wall member 70 that can define a pair of bearing journals 72, a pair of tube bores 74, a pinion bore 76 and a differential cavity 78. Each of the bearing caps 56 can be coupled (e.g., removably coupled) to an associated one of the bearing journals 72, e.g., via a pair of threaded fasteners (not shown). The bearing caps 56 and the bearing journals 72 can cooperate to define a pair of differential bearing journals 80 on which the differential assembly 34 may be supported for rotation about a first axis 82. The tube bore 74 can be aligned to the differential bearing journals 80 and can be sized to receive the axle tubes 58 therein. The pinion bore 76 can intersect the differential cavity 78 and can extend along a second axis 88 that can be generally perpendicular to the first axis 82. The cover 60 can be removably coupled to the carrier housing 54 to close an open end of the differential cavity 78. The carrier housing 54 and the cover 60 can cooperate to define the lubricant reservoir 62, and a suitable lubricant 90 can be contained therein. The first and second oil galleries 64 and 66 can be integrally formed with or coupled to the carrier housing 54.

The differential assembly 34 can be any type of differential and can include a differential case 100, a pair of differential bearings 102, a ring gear 104 and a gear set 106. In the particular example provided, the differential case 100 includes a first case member 110 and a second case member 112, but those of ordinary skill in the art will appreciate that the differential case 100 may be unitarily formed or may be formed from several case components. The first and second case members 110 and 112 can cooperate to define a mounting flange 116, a pair of trunnions 118 and a gear cavity 120 into which the gear set 106 can be received. The ring gear 104 can be coupled to the mounting flange 116 via a plurality of threaded fasteners 124. The trunnions 118 can be hollow structures that can extend from the opposite ends of the differential case 100.

The differential bearings 102 can be any type of bearings, such as tapered roller bearings, and can include an inner bearing race 130, a plurality of bearing elements 132, and an outer bearing race 134. The inner bearing race 130 of each differential bearing 102 can be coupled (e.g., press-fit) to a corresponding one of the trunnions 118. The outer bearing race 134 of each differential bearing 102 can be received in a corresponding one of the differential bearing journals 80 (i.e., between a bearing cap 56 and an associated one of the bearing journals 72). In the example provided, the bearing cap 56 can apply a clamping force to the outer bearing race 134 that clamps the outer bearing race 134 to the differential bearing journal 80.

The gear set 106 can include a pinion shaft 140, which can extend through the differential case 100 generally perpendicular to the first axis 82, a pair of pinion gears 142, which can be rotatably mounted on the pinion shaft 140, and a pair of side gears 144 that can be in meshing engagement with the pinion gears 142. The side gears 144 can include an inner diameter having a plurality of spline teeth (not specifically shown) formed thereon.

The input pinion assembly 36 can be received in the pinion bore 76 in the carrier housing 54 and can include an input pinion 150 and a pair of pinion bearings 152. The input pinion 150 can include a pinion portion 160, which can be meshingly engaged to the ring gear 104, and a shaft portion 162. The pinion bearings 152 can be tapered roller bearings or angular contact ball bearings having an inner bearing race 164, an outer bearing race 166 and a plurality of bearing elements 168 disposed between the inner and outer bearing races 164 and 166 to distribute load therebetween. The pinion bearings 152 can be mounted on the shaft portion 162 and coupled to the carrier housing 54 to support the input pinion 150 for rotation about a second axis 88 that can be perpendicular to the first axis 82.

The axle shafts 38 can be received through the axle tubes 58 and can be coupled for rotation with the side gears 144 (e.g., via mating sets of spline teeth (not specifically shown) formed on the inside diameter of the side gears 144 and the outer diameter of a portion of the axle shafts 38.

Figure 5:
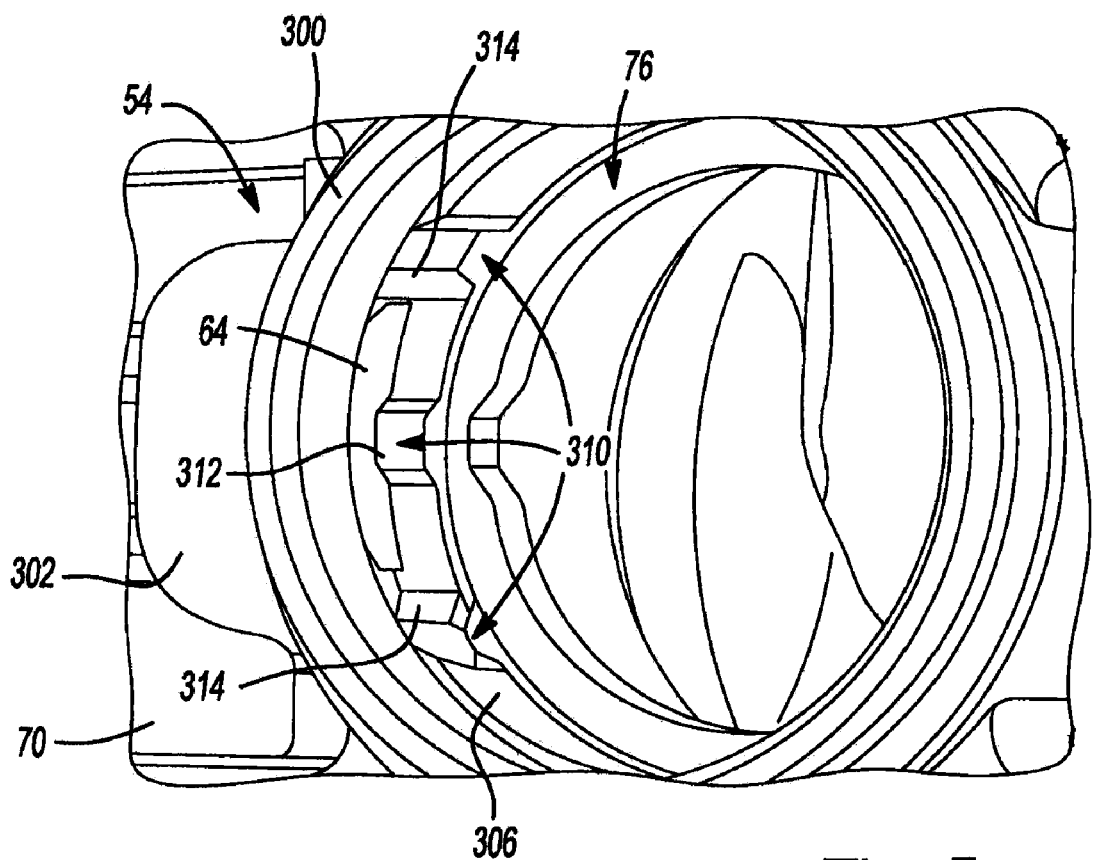
FIG. 5 is a perspective view of a portion of the axle assembly illustrating a portion of the carrier housing in which a bearing pocket is formed.

With reference to FIG. 5, the portion of the carrier housing 54 that includes the pinion bore 76 is illustrated in more detail. The wall member 70 of the carrier housing 54 includes a bearing pocket or cylindrical boss 300 and a projection 302 that is adjacent a side of the boss 300. The pinion bore 76 is formed through the boss 300 and includes a circumferentially extending surface 306. The first oil gallery 64 extends through the projection 302 and intersects the pinion bore 76. It will be appreciated that as the projection 302 "houses" a portion of the first oil gallery 64, the projection 302 cannot be eliminated or relocated to an area of the carrier housing 54 away from the boss 300. One or more recesses 310 can be formed into the circumferentially extending surface 306 to offset the effect of the projection 302 as will be described below in more detail. In the particular example provided, the recesses 310 have a geometry that includes a radially outward wall 312 and a pair of tapered side walls 314 that intersect the radially outward wall 312 and the circumferential surface 306 of the pinion bore 76. The recesses 310 can be sized, shaped and positioned around the circumference of the pinion bore 76 to compensate for differences in the rate of thermal expansion of the pinion bore 76. In this regard, the recesses 310 remove material from the boss 300 that would otherwise have contacted the outer diameter of the outer bearing race 166 (FIG. 4). The recesses 310 create interruptions or discontinuities in the circumferential surface 306 of the pinion bore 76 that aid in controlling the distribution of load through the bearing elements 168 (FIG. 4) over a predetermined range of operating temperatures, which could span a range that is greater than or equal to 150° F.

Figure 6:
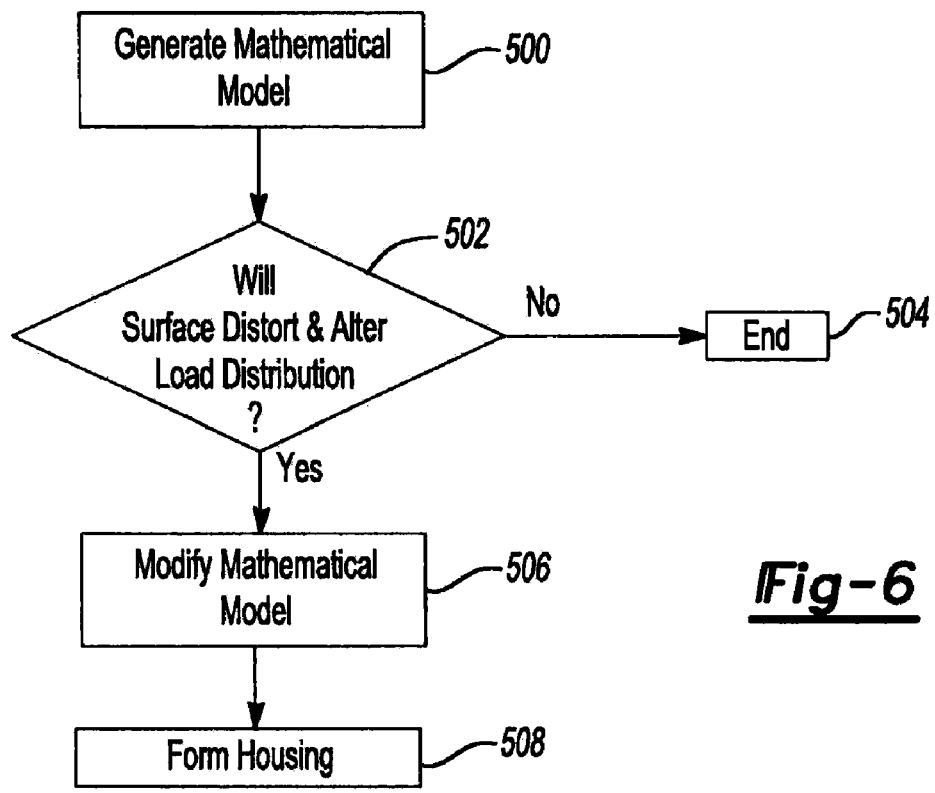
FIG. 6 is a schematic illustration of a method for customizing a bearing bore in a housing so that the bearing assembly will transmit load in a desired manner over a predetermined range of operating temperatures.

With reference to FIG. 6, a method for forming a bearing pocket in a housing is schematically illustrated. It will be appreciated that the bearing pocket is configured to receive a bearing assembly having an inner bearing race, an outer bearing race and a plurality of bearing elements disposed between the inner and outer bearing races and that the bearing pocket has a bearing bore with a circumferential surface that is configured to be engaged via an interference fit with the outer bearing race.

In block 500, a mathematical model of the housing can be generated. The mathematical model of the housing can mathematically define a geometry of at least a portion of the housing (such as a portion that includes the boss 300 and the projection 302 that are illustrated in FIG. 5) and a predetermined coefficient of thermal expansion. The method can continue at block 502.

In block 502, the mathematical model can be employed to determine whether the circumferential surface of the bearing bore will distort in response to a predetermined change in a temperature of the housing such that one or more of the bearing elements cease to distribute load between the inner bearing race and the outer bearing race in a desired manner (i.e., one or more of the bearing elements cease to distribute load between its associated inner bearing race and outer bearing race at a desired level). For example, the one or more of the bearing elements may cease to distribute any load between the inner bearing race and the outer bearing race and may therefore not contact one or both of the inner bearing race and the outer bearing race. As another example, the one or more bearing elements may distribute a relatively lower amount of load as compared to the remaining bearing elements (e.g., the one or more bearing elements can transmit less than 70%, 50%, or 30% of a load transmitted by a bearing element through which a maximum load is transmitted). If the one or more of the bearing elements do not cease to distribute load between the inner bearing race and the outer bearing race in the desired manner, the method can proceed to block 504, where the method can terminate. Otherwise, the method can proceed to block 506.

In block 506, the mathematical model of the housing can be modified to reflect a change in the geometry of the housing in which at least one recess is formed into the circumferential surface. The at least one recess is configured to reduce the distortion in the circumferential surface effected by the predetermined change in the temperature of the housing such that all of the bearing elements distribute load between the inner bearing race and the outer bearing race in a desired manner. In some instances, it may be sufficient that all of the bearing elements distribute load between the inner bearing race and the outer bearing race, while in other instances, it may be desirable that all of the bearing elements distribute an approximately uniform load between the inner bearing race and the outer bearing race. Thereafter, method can proceed to block 508 where the carrier housing 54 (FIG. 4) is formed in conformance with the modified mathematical model of the carrier housing 54 (FIG. 4).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for forming a bearing pocket in a housing, the bearing pocket being configured to receive a bearing assembly having an inner bearing race, an outer bearing race and a plurality of bearing elements disposed between the inner and outer bearing races, the bearing pocket having a bearing bore with a circumferential surface that is configured to be engaged via an interference fit with the outer bearing race, the method comprising:

generating a mathematical model of the housing, the mathematical model including a predetermined coefficient of thermal expansion and a definition of geometry of at least a portion of the housing that includes the bearing pocket;

using the mathematical model to determine where the circumferential surface of the bearing bore will distort in response to a predetermined change in a temperature of the housing such that one or more of the bearing elements cease to distribute load between the inner bearing race and the outer bearing race at a desired level;

modifying the mathematical model of the housing to reflect a change in the geometry of the housing in which at least one recess is formed in the circumferential surface, the at least one recess being configured to reduce the distortion of the circumferential surface effected by the predetermined change in the temperature of the housing such that all of the bearing elements distribute load between the inner bearing race and the outer bearing race; and forming the housing in conformance with the modified mathematical model of the housing.

2. The method of claim 1, wherein the at least one recess is configured to substantially equalize the load that is carried by each of the bearing elements.

3. The method of claim 2, wherein the bearing elements are selected from a group consisting of rollers and spherical balls.

4. The method of claim 1, wherein the bearing elements are selected from a group consisting of rollers and spherical balls.

5. The method of claim 1, wherein distortion of the circumferential surface of the bearing bore in the mathematical model causes at least one of the bearing elements to cease transmitting load between the inner bearing race and the outer bearing race.

6. The method of claim 1, wherein distortion of the circumferential surface of the bearing bore in the mathematical model causes at least one of the bearing elements to transmit a load that is less than 70% of a load transmitted by a selected bearing element through which a maximum load is transmitted.

7. The method of claim 6, wherein the load that is transmitted by the at least one of the bearing elements is less than 50% of the load transmitted by the selected bearing element.

8. The method of claim 7, wherein the load that is transmitted by the at least one of the bearing elements is less than 30% of the load transmitted by the selected bearing element.

9. The method of claim 1, wherein the predetermined change in the temperature of the housing is greater than or equal to 150° F.

10. A method for forming a bearing pocket in a housing, the bearing pocket being configured to receive a pair of bearing assemblies that are spaced apart from one another, each bearing assembly having an inner bearing race, an outer bearing race and a plurality of bearing elements disposed between the inner and outer bearing races, the bearing pocket having a bearing bore with a circumferential surface that is configured to be engaged via an interference fit with the outer bearing races, the method comprising:

generating a mathematical model of the housing, the mathematical model including a predetermined coefficient of thermal expansion and a definition of geometry of at least a portion of the housing that includes the bearing pocket;

using the mathematical model to determine where the circumferential surface of the bearing bore will distort in response to a predetermined change in a temperature of the housing such that one or more of the bearing elements cease to distribute load between an associated pair of the inner bearing races and the outer bearing races;

modifying the mathematical model of the housing to reflect a change in the geometry of the housing to reduce the distortion of the circumferential surface effected by the predetermined change in the temperature of the housing such that all of the bearing elements distribute load between the associated pairs of inner bearing races and the outer bearing races at a desired level; and forming the housing in conformance with the modified mathematical model of the housing.

11. The method of claim 10, wherein the change in the geometry of the housing is configured to substantially equalize the load that is carried by each of the bearing elements.

12. The method of claim 11, wherein the bearing elements are selected from a group consisting of rollers and spherical balls.

13. The method of claim 10, wherein the bearing elements are selected from a group consisting of rollers and spherical balls.

14. The method of claim 10, wherein distortion of the circumferential surface of the bearing bore in the mathematical model causes at least one of the bearing elements to transmit a load that is less than 70% of a load transmitted by a selected bearing element through which a maximum load is transmitted.

15. The method of claim 14, wherein the load that is transmitted by the at least one of the bearing elements is less than 50% of the load transmitted by the selected bearing element.

16. The method of claim 15, wherein the load that is transmitted by the at least one of the bearing elements is less than 30% of the load transmitted by the selected bearing element.

17. The method of claim 10, wherein modifying the mathematical model of the housing further includes removing material from a portion of the circumferential surface of the bearing bore.

18. The method of claim 10, wherein the predetermined change in the temperature of the housing is greater than or equal to 150° F.

19. The method of claim 10, wherein the one or more of the bearing elements cease touching at least one of the inner bearing race and the outer bearing race of the associated pair of inner bearing races and outer bearing races when the one or more of the bearing elements cease to distribute load between the associated pairs of inner bearing races and the outer bearing races at a desired level.

20. A method for forming a bearing pocket in a housing, the bearing pocket being configured to receive a pair of bearing assemblies, each bearing assembly having an inner bearing race, an outer bearing race and a plurality of bearing elements disposed between the inner and outer bearing races, the bearing elements comprising a plurality of roller or spherical balls, the bearing pocket having a bearing bore with a circumferential surface that is configured to be engaged via an interference fit with the outer bearing races, the method comprising:

generating a mathematical model of the housing, the mathematical model including a predetermined coefficient of thermal expansion and a definition of geometry of at least a portion of the housing that includes the bearing pocket;

using the mathematical model to determine where the circumferential surface of the bearing bore will distort in response to a predetermined change in a temperature of the housing such that one or more of the bearing elements cease to distribute load between the inner bearing race and the outer bearing race, the predetermined change in temperature of the housing being greater than or equal to 150° F.;

modifying the mathematical model of the housing to reflect a change in the geometry of the housing in which at least one recess is formed in the circumferential surface, the change in the geometry of the housing being configured to reduce the distortion of the circumferential surface effected by the predetermined change in the temperature of the housing such that all of the bearing elements distribute load between their associated inner bearing race and the outer bearing race such that the load that is carried by each of the bearing elements is substantially equalized; and forming the housing in conformance with the modified mathematical model of the housing.

* * * * *